SIGNAL REGENERATING CIRCUIT USING SOLID-STATE THYRATRON SWITCH

Filed Nov. 20, 1962

INVENTOR
RICHARD D. SCOTT

BY R. C. Terry
ATTORNEY

United States Patent Office 3,217,182

Patented Nov. 9, 1965

3,217,182
SIGNAL REGENERATING CIRCUIT USING SOLID-STATE THYRATRON SWITCH

Richard D. Scott, Chicago, Ill., assignor to Teletype Corporation, Skokie, Ill., a corporation of Delaware Filed Nov. 20, 1962, Ser. No. 238,994
4 Claims. (Cl. 307—88.5)

This invention relates to circuits for regenerating data bits received in a prescribed timed relationship and more specifically to a circuit for regenerating a distorted composite binary data signal provided by a teletypewriter transmitter.

In the transmission of teletypewriter signals from a transmitter, the signals originally generated are often distorted due to faulty operation, such as contact chatter. Often the signals are so distorted that the intelligence to be transmitted is too inaccurate. In order to correct this situation, each mark and space signal of the transmitter output must be monitored, and a new signal must be generated for each mark and space signal.

An object of this invention is to provide a new and improved signal regenerating circuit wherein each input signal is monitored and a new signal is generated therefor.

Another object of this invention is to provide a new and improved signal regenerating circuit for regenerating composite teletypewriter signals.

An additional object of this invention is to provide a new, improved, simple, reliable and economical signal regenerating circuit.

With these and other objects in mind, the present invention relates to a circuit for regenerating distorted data bits received in a prescribed timed relationship. A static latching switch is provided which is rendered conductive in response to the application thereto of a control signal, if the static latching switch previously has been conditioned for conduction. Circuitry is provided for conditioning the static latching switch for conduction in response to the sensing of input data bits of a predetermined type. Control circuitry is provided for causing a control signal to be applied to the static latching switch at predetermined time intervals, and a source of potential is associated with the static latching swich which causes current to flow therethrough when the static latching switch is rendered conductive by the coincidence of the control signal with a data bit of the above-mentioned predetermined type. An output conductor is so associated with the static latching switch that a regenerated data bit of the above-predetermined type is produced therein between the time period when the static latching switch is rendered conductive and the next control signal.

Other objects, advantages and features will become apparent by reference to the following detailed description and the accompanying drawings, wherein.

Referring now to the drawing wherein like reference numerals designate like elements and more specifically to FIG. 1, in which a simplified schematic diagram of a signal regenerating circuit is illustrated. This circuit may be utilized if the circuit components have ideal characteristics.

Figure 1:
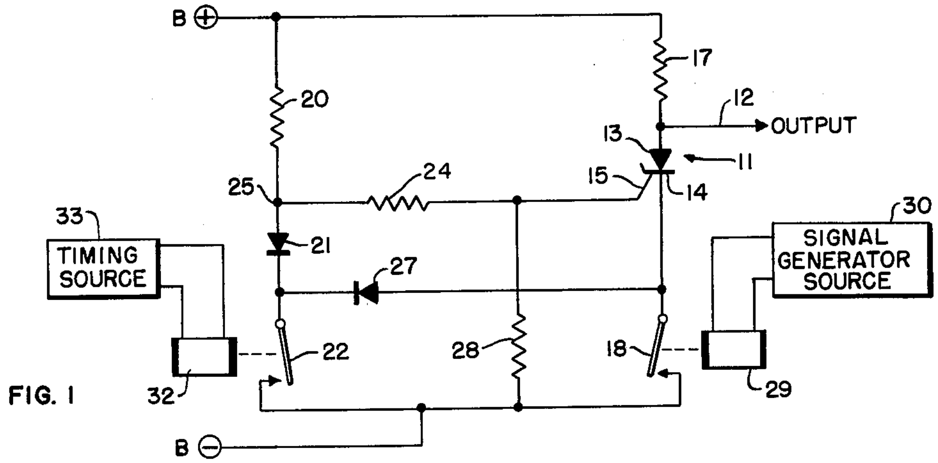
FIG. 1 is a simplified schematic diagram of a preferred embodiment of the signal regenerating circuit of this invention.

The signal regenerating circuit includes a static latching switch in the form of a silicon controlled rectifier 11 which is provided to control the production of output signals in an output conductor 12. The silicon controlled rectifier 11 includes an anode 13, a cathode 14 and a gate electrode 15. The anode 13 of the silicon controlled rectifier 11 is connected through a resistor 17 to a positive potential, designated as B+ and illustrated as +20 volts, and the cathode 14 thereof is connected through a signal generator contact 18 to a negative potential, designated as B— and illustrated as —20 volts.

If a positive control signal is applied to the gate electrode 15 of the silicon controlled rectifier 11 and if the signal generator contact 18 is closed, the silicon controlled rectifier 11 is rendered conductive so that current flows from the positive potential B+ through the silicon controlled rectifier 11 and the signal generator contact 18 to the negative potential B—. Thus, the signal generator contact 18 operates to condition the silicon controlled rectifier 11 for conduction.

A resistor 20, a diode 21 and a timing contact 22 are connected in series between the positive potential B+ and the negative potential B—, and these components operate together to provide a source of positive control signals for the gate electrode 15 of the silicon controlled rectifier 11. The gate electrode 15 is connected through a current limiting resistor 24 to a common terminal 25 of the resistor 20 and the diode 21. If the timing contact 22 is closed, the terminal 25 is placed at a negative potential value corresponding to the value of the negative potential B— and a negative control signal is applied through the current limiting resistor 24 to the gate electrode 15 of the silicon controlled rectifier 11; so that the silicon controlled rectifier is not rendered conductive. If the timing contact 22 is open, terminal 25 is placed at a positive potential value corresponding to the value of the positive potential B+ and a positive control signal is applied through the current limiting resistor 24 to the gate electrode 15 of the silicon controlled rectifier 11 so that the silicon controlled rectifier is rendered conductive if the signal generator contact 18 previously has been closed to condition the silicon controlled rectifier for conduction.

The output conductor 12 is preferably connected directly to the anode 13 of the silicon controlled rectifier 11. When the silicon controlled rectifier 11 is not conducting, the anode 13 thereof is at a positive potential value corresponding to the value of the positive potential B+ so that a positive potential output signal is provided in the output conductor 12. When the silicon controlled rectifier 11 is rendered conductive, the potential at the anode 13 drops to a negative value corresponding to the value of the negative potential B— so that a negative output signal is provided in the output conductor 12.

When the previously mentioned timing contact 22 is closed, a conducting path is provided from the cathode 14 of the silicon controlled rectifier 11 through a diode 27 and the timing contact 22 to the negative potential B—. Thus, two paths of current flow are provided from the cathode 14 to the negative potential B—. Once the silicon controlled rectifier 11 is rendered conductive, it will be rendered nonconductive only when the current flowing therethrough drops below a cutoff level (when no path for current flow is provided from the cathode 14 to the negative potential B— in the illustrated circuit). Thus, both the signal generator contact 18 and the timing contact 22 must be open for the silicon controlled rectifier 11 to be rendered nonconductive once it has been rendered conductive.

The signal generator contact 18 is shown as being controlled by operation of a signal generator relay 29. This signal generator relay 29 is energized in response to the application thereto of a positive input data bit (marking teletypewriter signal) to cause the signal generator contact to be closed. The regenerator may be used with a teletypewriter transmitter in which the contact 18 is driven directly through mechanical linkages such as shown in the United States Patent No. 2,795,646, issued June 11, 1957, to G. Sim and assigned to the same assignee as this invention. When this is done, the relay 29 may be eliminated.

The signal generator relay 29 is deenergized in response to the application thereto of a negative input data bit (spacing teletypewriter signal) to cause the signal generator contact 18 to be opened. Positive and negative input data bits are applied to the signal generator relay 29 by a suitable signal generator source 30.

The timing contact 22 is shown as being controlled by operation of a timing relay 32 which is energized in response to the application thereto of a positive control signal to cause the timing contact 22 to be closed. The timing relay 32 is deenergized in response to the application thereto of a negative control signal to cause the timing contact 22 to be opened. Positive and negative control signals are applied to the timing relay 32 by a timing source 33. In the illustrated embodiment, a positive control signal is normally applied to the timing relay 32 by the timing source 33. At predetermined time intervals (spaced apart a time period corresponding to the desired time period of each input data bit), negative control signals are applied to the timing relay 32 to cause the timing contact 22 to be opened at predetermined intervals for predetermining periods of time. It should be noted that the timing contact 22 also may be driven directly by the cam shaft of the transmitter when a transmitter of the type shown in the aforementioned patent is used.

A resistor 28 is connected between the gate electrode 15 of the silicon controlled rectifier 11 and the negative potential B— to prevent the silicon controlled rectifier from being rendered conductive by anode to cathode leakage current.

Figure 3:
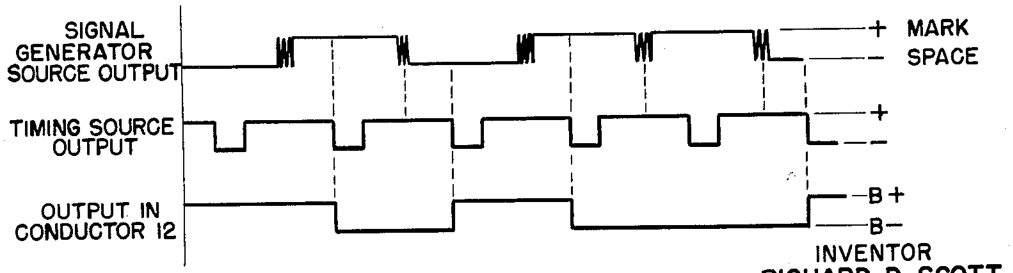
FIG. 3 illustrates wave forms for the signal regenerating circuit illustrated in FIGS. 1 and 2.

Assume the signal generator source output illustrated in FIG. 3 is applied to the signal generator relay 29 by the signal generator source 30 and assume the timing source output illustrated in FIG. 3 is applied to the timing relay 32 by the timing source 33. Since the first input data bit is negative (spacing teletypewriter signal), the signal generator relay 29 is not energized and the signal generator contact 18 is not closed; so that the silicon controlled rectifier 11 is not conditioned for conduction. A negative control signal is applied to the timing relay 32 during the time period of the first input data bit which causes the timing relay 32 to be deenergized and the timing contact 22 to be opened so that a positive control signal is applied to the gate electrode 15 of the silicon controlled rectifier 11. However, the positive control signal applied to the gate electrode 15 will have no effect on the silicon controlled rectifier 11 since the silicon controlled rectifier has not been conditioned for conduction by the closing of the signal generator contact 18.

Since the second input data bit applied to the signal generator relay 29 is positive (marking teletypewriter signal), the signal generator relay 29 is energized and the signal generator contact 18 is closed to condition the silicon controlled rectifier 11 for conduction. A negative control signal applied to the timing relay 32 during the time period of the second input data bit causes the timing relay 32 to be deenergized and the timing contact 22 to be opened so that a positive control signal is applied to the gate electrode 15 of the silicon controlled rectifier 11. In response to the application of the positive control signal to the gate electrode 15, the silicon controlled rectifier 11 is rendered conductive since it was previously conditioned for conduction by the closing of the signal generator contact 18. When the silicon controlled rectifier 11 is rendered conductive, the potential at the anode 13 thereof drops from a value corresponding to the value of the positive potential B+ to a value corresponding to the value of the negative potential B— so that an output signal is provided in the output conductor 12 which changes from a value of B+ to a value of B— as illustrated in FIG. 3.

The signal generator contact 18 is opened at the end of the time period of the second input data bit since the third input data bit is negative (spacing teletypewriter signal). However, at the end of the time period of the second input data bit, a positive control signal is applied to the timing relay 32 so that the timing relay is energized and the timing contact 22 is closed. The silicon controlled rectifier 11 continues to conduct as long as the timing contact 22 is maintained closed since a conducting path is provided from the cathode 14 through the diode 27 and the timing contact 22 to the negative potential B—. The timing contact 22 is subsequently opened during the time period of the third input data bit in response to the application of a negative control signal to the timing relay 32, and the silicon controlled rectifier 11 is rendered nonconductive since the signal generator contact 18 and the timing contact 22 are both open. The output signal provided in the output conductor 12 thus rises from a value of B— to a value of B+ as illustrated in FIG. 3 since the potential value at the anode 13 of the silicon controlled rectifier 11 rises from a value of B— to a value of B+ when the silicon controlled rectifier is rendered nonconductive.

It is to be noted that the regenerated output signal in conductor 12 is inverted as compared to the signal generator source output shown in FIG. 3.

Figure 2:
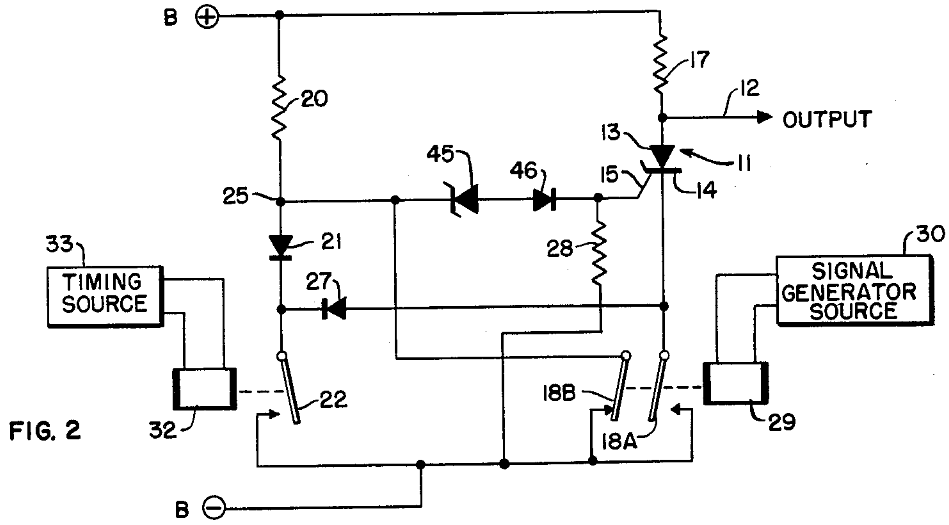
FIG. 2 is a detailed schematic diagram of a preferred embodiment of the signal regenerating circuit of this invention.

If the timing contact 22 provides substantial contact resistance, or if the circuit provides substantial stray capacitance, the signal regenerating circuit illustrated in FIG. 2 must be substituted for the signal regenerating circuit illustrated in FIG. 1. The signal regenerating circuit of FIG. 2 is essentially the same as the signal regenerating circuit of FIG. 1 except that several additional circuit components have been connected therein to prevent faulty operation thereof due to contact resistance or stray capacitance.

In the signal regenerating circuit of FIG. 2, the signal generator relay 29 has two contacts 18A and 18B rather than a single contact 18 and these contacts respond to the operation of the signal generator relay 29 as set forth hereinafter. One of the contacts 18A is a marking contact which operates similarly to the operation of the signal generator contact 18 in the signal regenerating circuit of FIG. 1 to condition the silicon controlled rectifier 11 for conduction. The other contact 18B is a spacing contact which operates in opposition to the contact 18A, that is, when the contact 18A is open, the contact 18B is closed; and when the contact 18A is closed, the contact 18B is opened. The contact 18B has been provided to negate the effect of circuit stray capacitance to prevent false conduction of the silicon controlled rectifier due to stray capacitance.

If the contact 18B is not provided, the potential on the gate electrode 15 rises to some value above B— when the contacts 18A and 22 are open since the resistor 20, diodes 45 and 46, and the resistor 28 form a voltage divider connected between B+ and B—. As a result, the stray capacitance between the cathode 14 of the silicon controlled rectifier and ground or other portions of the circuit is charged to a value intermediate B+ and B—. When the timing contact 22 then is closed, the stray capacitance discharges over the very low impedance path from the cathode 14 of the silicon controlled rectifier through the diode 27 and the now closed contact 22 to B—. Since this discharge takes place rapidly through substantially a short circuit, oscillation tends to occur and the potential on the cathode 14 of the silicon controlled rectifier drops to a value below B—. Since the gate electrode 15 has a potential of B— applied to it when the contact 22 is closed, the silicon controlled rectifier may then be triggered into conduction even though the contact 18A is open. The contact 18B prevents this.

When the contact 18B is closed, it clamps the gate electrode 15 of the silicon controlled rectifier to the negative potential B−. This prevents the stray capacitance mentioned in the previous paragraph from charging to a potential having a value above B−. Thus when the contact 22 is closed causing the negative potential B− to be applied to the cathode 14 of the silicon controlled rectifier, no discharge of the stray capacitance takes place since it is charged to the same potential; and no faulty firing of the silicon controlled rectifier can occur.

A Zener diode 45 and a conventional diode 26 are connected in series between the gate electrode 15 of the silicon controlled rectifier 11 and the terminal 25. The diode 46 is provided to prevent current from flowing from the gate electrode 15 to the terminal 25. In the signal regenerating circuit of FIG. 2, the Zener diode 45 is so designed that it is not rendered conducting until the potential at the terminal 25 attains a predetermined value. The Zener diode 45 is not rendered conductive and a positive control signal is not applied to the gate electrode 15 of the silicon controlled rectifier 11 until the timing contact 22 is opened after the opening of the contact 18B and the closing of the contact 18A.

The Zener diode 45 prevents false firing of the silicon controlled rectifier 11 due to contact resistance of the timing contact 22 and due to stray capacitance. When the timing contact 22 is closed, the resistance of the timing contact and the resistance of the resistor 20 act as a voltage divider and, if the timing contact 22 has sufficient resistance, the potential at terminal 25 has a value which may be sufficient to apply a positive control signal to the gate electrode 15 to cause the silicon controlled rectifier 11 to be rendered conductive. With the Zener diode 45 connected between the terminal 25 and the gate electrode 15, a positive control signal is not applied to the gate electrode 15 until the potential at terminal 25 reaches a value corresponding to the turn on potential of the Zener diode 45, and the potential at the terminal 25 only attains this value when the timing contact 22 is opened.

The other circuit components of the signal regenerating circuit of FIG. 2 are identical to the circuit components of the signal regenerating circuit of FIG. 1, and the signal regenerating circuit of FIG. 2 operates in the same manner as described hereinbefore for the signal regenerating circuit of FIG. 1. Thus, it may be seen that the signal regenerating circuit of FIG. 2 operates to regenerate incoming data bits so that distorted incoming data bits are regenerated as nondistorted data bits. Also, it should be noted that the signal regenerating circuit of FIG. 2 is neither affected by contact resistance nor by stray capacitance.

While preferred embodiments of the invention have been disclosed, many modifications thereof will be apparent to those skilled in the art, such as using a silicon controlled switch for the static latching switch; and it is intended that the invention be interpreted as including all modifications which fall within the true spirit and scope of the invention.

What is claimed is:

1. A circuit for regenerating a signal comprised of data bits transmitted in a prescribed timed relationship including:

(a) a static latching switch, having an anode, a cathode, and a gate electrode, which is rendered conductive in response to the application of a control signal if the latching switch previously has been conditioned for conduction and which remains conductive as long as the current flowing therethrough remains above a cut-off level;

(b) a normally open contact connected in series with the cathode of the static latching switch, the normally open contact being closed in response to data bits of a predetermined type to condition the latching switch for conduction;

(c) a normally closed contact associated with the gate electrode and the cathode of the latching switch to cause a control signal to be applied to the control electrode when the normally closed contact is opened in response to a timing signal to render the latching switch conductive if the latching switch previously has been conditioned for conduction by closure of the normally open contact, the normally closed contact providing a holding path for current conduction through the static latching switch when the normally closed contact is closed following the timing signal, the static latching switch being rendered nonconductive when both of said contacts are open simultaneously; and (d) an output conductor so associated with the static latching switch that a regenerated signal is produced therein as the static latching switch is rendered conductive and nonconductive.

2. A circuit according to claim 1 wherein the static latching switch is a silicon controlled rectifier.

3. A circuit according to claim 2 having means for preventing the silicon controlled rectifier from conducting due to leakage current and leakage capacitance.

4. A circuit for regenerating a signal comprised of data bits transmitted in a prescribed timed relationship including:

(a) a static latching switch, having an anode, a cathode, and a gate electrode, which is rendered conductive in response to the application of a control signal if the latching switch previously has been conditioned for conduction and which remains conductive as long as the current flowing therethrough remains above a cut-off level;

(b) normally open switching means connected in series with the anode-cathode path of the static latching switch, the switching means being closed in response to data bits of a predetermined type for conditioning the latching switch for conduction, (c) normally closed switching means connected to the gate electrode and the anode-cathode path of the latching switch for applying a control signal to the gate electrode when the normally closed switching means is opened for rendering the latching switch conductive if the latching switch previously has been conditioned for conduction by closure of the normally open switching means, the normally closed switching means providing a holding path for current conduction through the static latching switch when the normally closed switching means is closed, the static latching switch being rendered nonconductive when both of said switching means are open simultaneously.

References Cited by the Examiner

UNITED STATES PATENTS

| | | | |
|---|---|---|---|
| 3,040,270 | 6/62 | Gutzwiller | 307—88.5 |
| 3,134,048 | 5/64 | Wolfframm et al. | 397—88.5 X |
| 3,142,832 | 7/64 | Horne | 307—88.5 X |
| 3,158,758 | 11/64 | Pearson | 307—88.5 |

OTHER REFERENCES

Solid State Products, Inc., Bulletin D 420-02-12-59, page 27, December 1959.

Frenzel et al.: "Solid-State Thyratron Switches Kilowatts, Electronics," March 28, 1958, pp. 52–55.

Jones: "Turn-off Circuits for Controlled Rectifiers," Electronics, vol. 33, No. 32, pp. 52–55, Aug. 5, 1960.

JOHN W. HUCKERT, *Primary Examiner.*

ARTHUR GAUSS, *Examiner.*